United States Patent
Lin et al.

(10) Patent No.: US 8,607,255 B2
(45) Date of Patent: Dec. 10, 2013

(54) OPTICAL DISC DRIVE AND DAMPER POSITIONING STRUCTURE THEREOF

(75) Inventors: Chia-Yuan Lin, Taipei (TW); Cheng-Chung Hsu, Taipei (TW); Chun-Lung Ho, Taipei (TW)

(73) Assignee: Lite-On It Corporation, Taipei (TW)

( * ) Notice: Subject to any disclaimer, the term of this patent is extended or adjusted under 35 U.S.C. 154(b) by 70 days.

(21) Appl. No.: 13/461,385

(22) Filed: May 1, 2012

(65) Prior Publication Data
US 2013/0232512 A1    Sep. 5, 2013

(30) Foreign Application Priority Data
Mar. 5, 2012    (CN) .......................... 2012 1 0054915

(51) Int. Cl.
*G11B 33/02*    (2006.01)
(52) U.S. Cl.
USPC ........................................................ 720/651
(58) Field of Classification Search
USPC ......... 720/651, 604, 644, 692, 611, 601, 616, 720/679, 657, 635, 655, 632, 603, 671, 619
See application file for complete search history.

(56) References Cited

U.S. PATENT DOCUMENTS

| | | | | |
|---|---|---|---|---|
| 6,125,090 A * | 9/2000 | Nakamichi | ................... | 720/622 |
| 2007/0107000 A1* | 5/2007 | Peng | .............................. | 720/600 |
| 2010/0157469 A1* | 6/2010 | Ichikawa et al. | ........... | 360/97.02 |

* cited by examiner

*Primary Examiner* — Allen T Cao
(74) *Attorney, Agent, or Firm* — Muncy, Geissler, Olds & Lowe, PLLC

(57) ABSTRACT

The present invention provides an optical disc drive and a damper positioning structure thereof. The optical disc drive includes a top cover, a traverse, and a chassis, and the damper positioning structure comprising: a bent element provided on the top cover and having an extension portion and a fixing portion, wherein the fixing portion has a through hole; a positioning pillar provided on the chassis; and a damper for supporting and securing the traverse on the chassis, wherein the damper has a positioning hole through which the positioning pillar is insertable; wherein, when the top cover is assembled to the chassis, the positioning pillar passes through the through hole of the fixing portion, and the fixing portion presses against the damper.

8 Claims, 5 Drawing Sheets

OPTICAL DISC DRIVE AND DAMPER POSITIONING STRUCTURE THEREOF

BACKGROUND OF THE INVENTION

1. Technical Field

The present invention relates to an optical disc drive and a damper positioning structure thereof. More particularly, the present invention relates to a half-height optical disc drive and a damper positioning structure thereof.

2. Description of Related Art

A conventional half-height optical disc drive includes a chassis, a traverse, and a top cover. The traverse further includes moving mechanisms, such as a spindle motor, an optical pickup head, and a stepper motor, etc.; consequently, the traverse is the major source of vibrations in the optical disc drive. However, if the optical pickup head, which must be precisely positioned, is subjected to vibrations that cause the optical pickup head failing to align precisely with the recording tracks of a disc, errors in data reading will occur. Besides, vibrations transmitted to the outer portion of the optical disc drive may cause an annoying noise.

As a solution to the vibration problems, the traverse of a conventional optical disc drive is installed on the chassis typically via a plurality of dampers configured for absorbing vibrations of the traverse. Each damper has a neck and a positioning hole, wherein the neck is engaged with a flange of the traverse. Each damper is fastened to a corresponding fixing hole on the chassis by a screw passing through the positioning hole. Hence, by means of the dampers, the traverse is floatingly provided on the chassis, so as for the dampers to absorb the vibration energy of the traverse.

While the dampers can effectively absorb vibrations, the use of screws to secure the dampers not only increases material cost but also requires additional manpower for fastening the screws. Therefore, the design of the conventional optical disc drives needs further improvement to lower cost and thereby increase the price competitiveness of optical disc drives in general.

BRIEF SUMMARY OF THE INVENTION

In view of the aforesaid drawbacks of the prior art, it is an object of the present invention to provide a damper positioning structure of an optical disc drive, wherein the damper positioning structure is configured for directly securing dampers in place so as to replace the screws conventionally required for fastening the dampers. Thus, the production cost of assembly jigs can be reduced, and the time otherwise required for fastening the screws can be saved to enhance production efficiency. Moreover, assembly variations can be minimized, and the labor cost of production lines, lowered.

Therefore, one aspect of the present is to provide a damper positioning structure of an optical disc drive, wherein the optical disc drive includes a top cover, a traverse, and a chassis, and the damper positioning structure comprising: a bent element provided on the top cover and having an extension portion and a fixing portion, wherein the fixing portion has a through hole; a positioning pillar provided on the chassis; and a damper for supporting and securing the traverse on the chassis, wherein the damper has a positioning hole through which the positioning pillar is insertable; wherein, when the top cover is assembled to the chassis, the positioning pillar passes through the through hole of the fixing portion, and the fixing portion presses against the damper.

Another aspect of the present is to provide an optical disc drive, comprising: a traverse; a top cover having a bent element, the bent element having an extension portion and a fixing portion, wherein the fixing portion has a through hole; a chassis having a positioning pillar; and a damper for supporting and securing the traverse on the chassis, wherein the damper has a positioning hole through which the positioning pillar is insertable; wherein, when the top cover is assembled to the chassis, the positioning pillar passes through the through hole of the fixing portion, and the fixing portion presses against the damper.

DETAILED DESCRIPTION OF THE INVENTION

To facilitate understanding of the various aspects of the present invention, the technical means adopted by the present invention to achieve the above object, features, and effects are described hereinafter with reference to the accompanying drawings.

Figure 1:
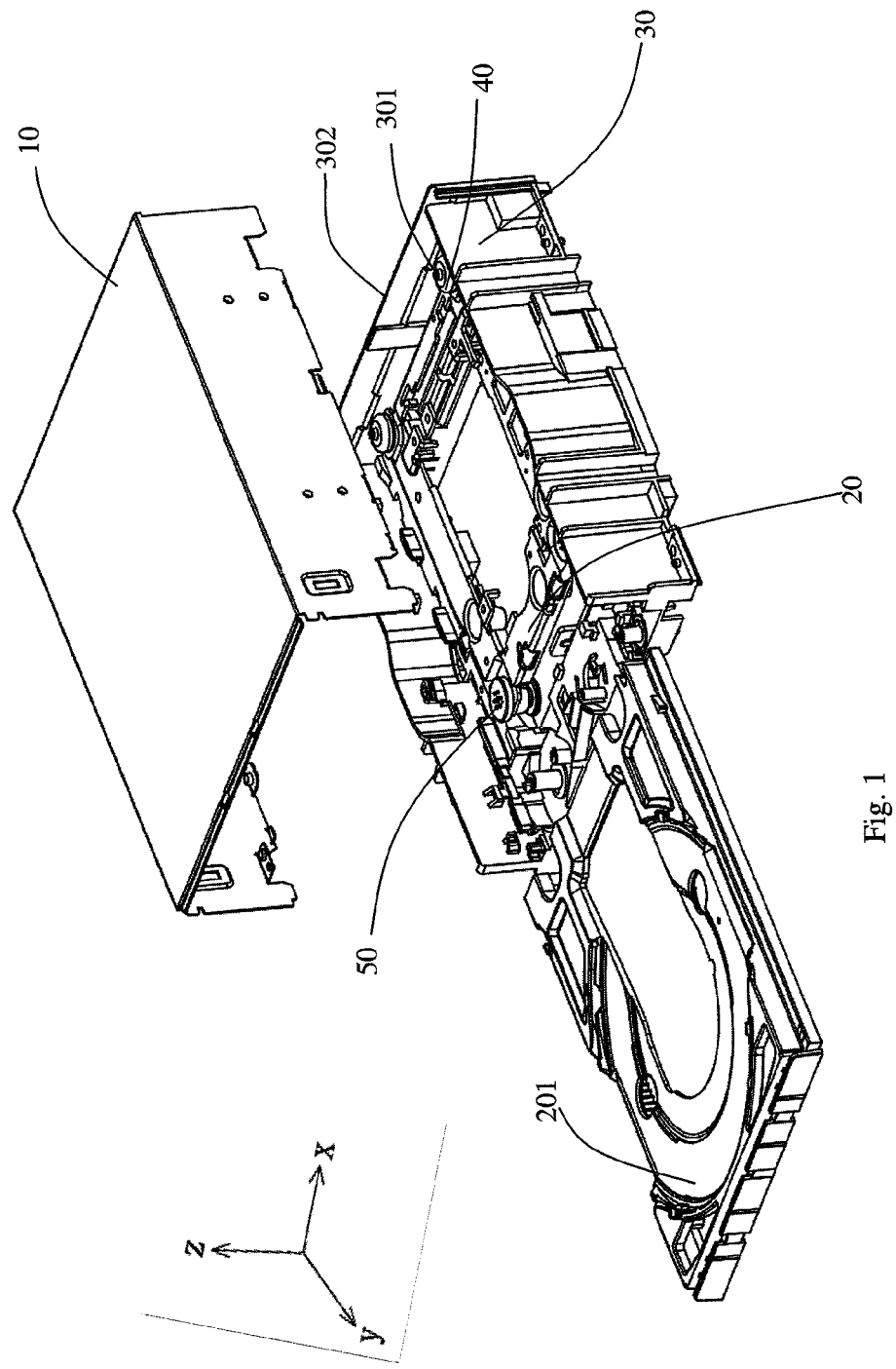
FIG. 1 is an exploded perspective view of the optical disc drive according to an embodiment of the present invention.

Referring to FIG. 1 for an exploded perspective view of the optical disc drive 60 in an embodiment of the present invention, the optical disc drive 60 includes a top cover 10, a traverse 20, and a chassis 30. The traverse 20 is provided with a plurality of moving mechanism (not shown) such as a spindle motor, an optical pickup head, and a stepper motor. The traverse 20 is installed on the chassis 30 by way of a plurality of front dampers 50 and a plurality of rear dampers 40. The top cover 10 is located above and covers the chassis 30 in order to protect the components inside the optical disc drive 60.

The damper positioning structure disclosed by the present invention includes a bent element 100 and a positioning pillar 301. The bent element 100 is provided on the top cover 10 (see FIG. 4) and is configured for restricting vertical displacement of the damper. The positioning pillar 301 is provided on the chassis 30 and is configured for restricting horizontal displacement of the damper. The bent element 100 on the top cover 10 has a pressing and securing effect which, together with the positioning pillar 301, holds the corresponding damper 40 in position. More details of the disclosed damper positioning structure for use in an optical disc drive are described below with reference to the accompanying drawings.

Figure 2:
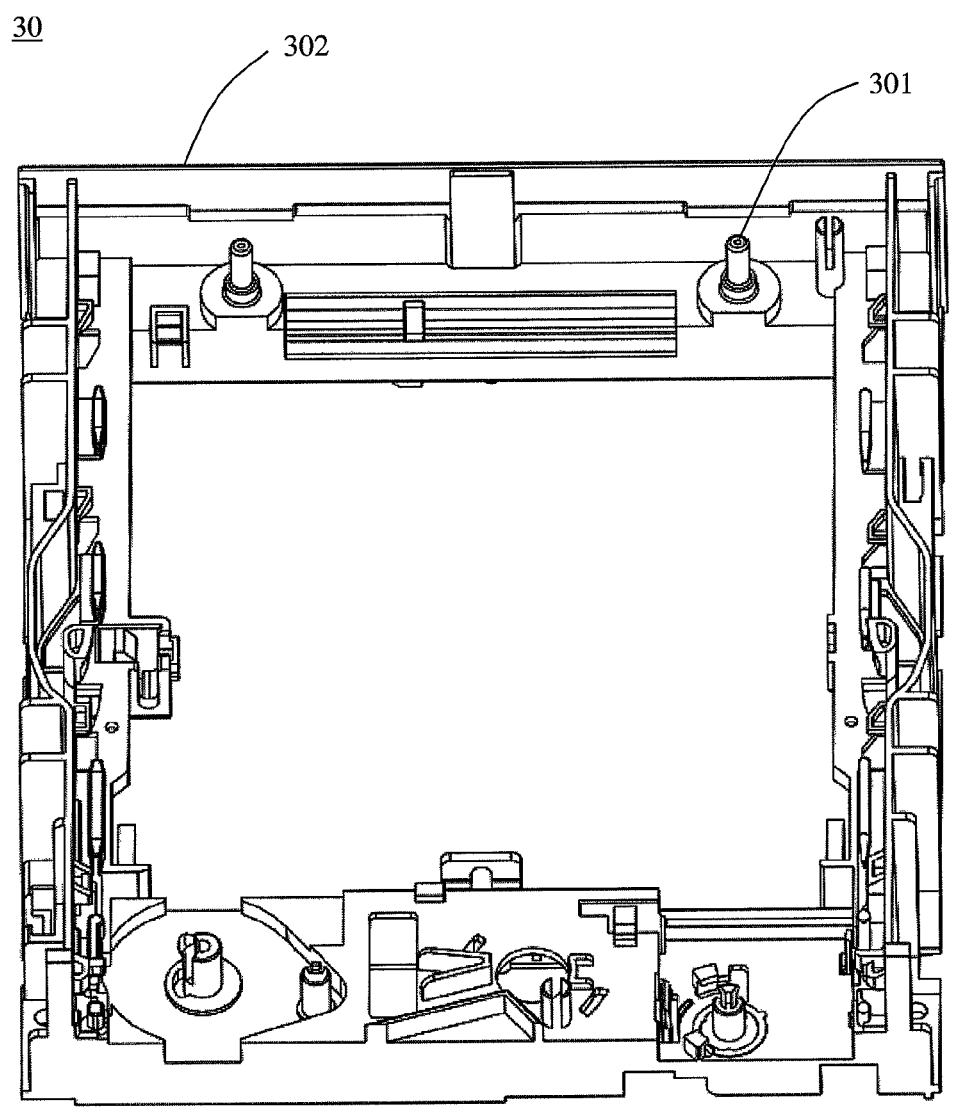
FIG. 2 is a top view of the chassis of the optical disc drive according to an embodiment of the present invention.
Figure 3:
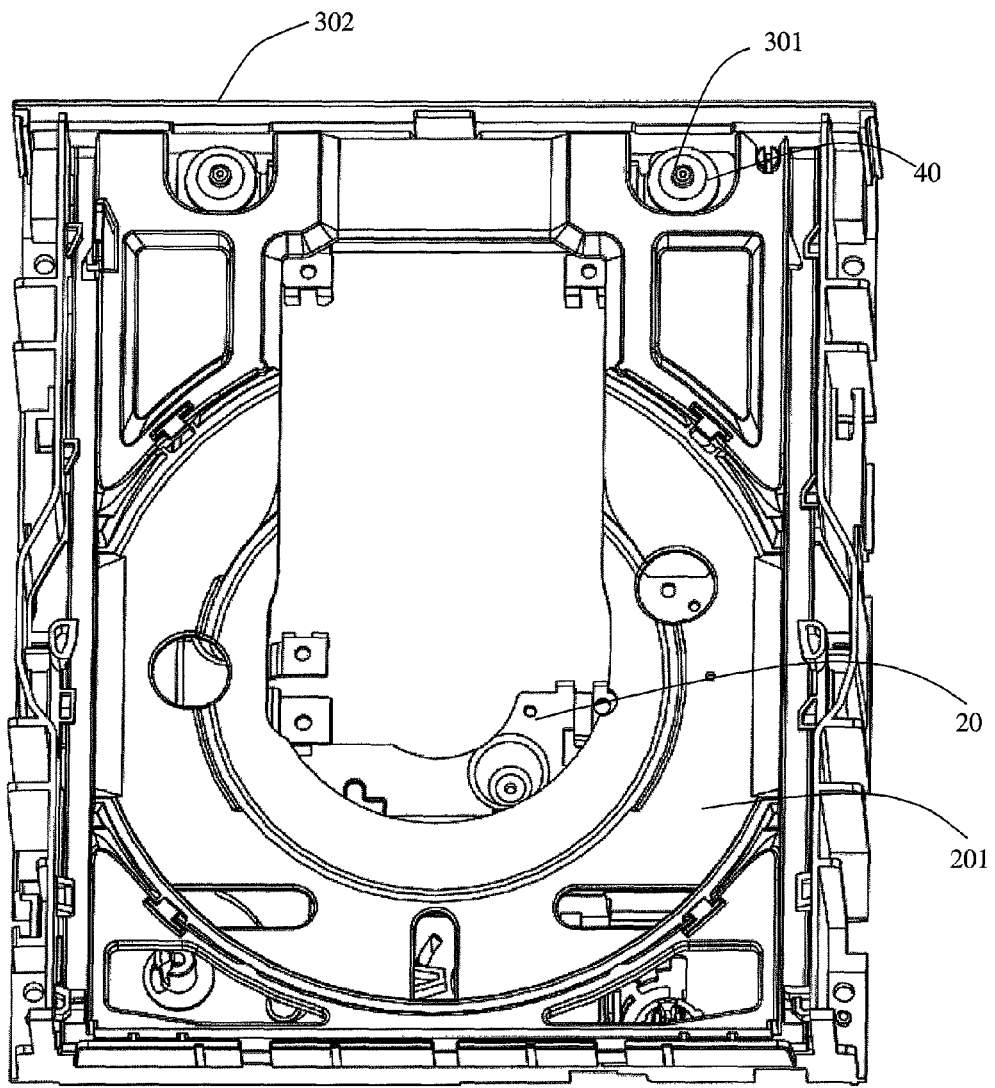
FIG. 3 is a top view of the optical disc drive according to an embodiment of the present invention, with the top cover removed.

FIG. 2 schematically shows the chassis 30 of the optical disc drive in an embodiment of the present invention. The chassis 30 is provided with a plurality of positioning pillars 301 for restricting horizontal displacement of the dampers 40 and 50. In a preferred embodiment, the dampers to be positioned by the damper positioning structure are the rear dampers 40. The dampers 40 and 50 each have a neck for supporting and securing the traverse 20 and a positioning hole through which a corresponding one of the positioning pillars 301 is inserted. Thus, with the positioning pillars 301 restricting horizontal displacement of the corresponding dampers 40 respectively, the dampers 40 are secured in place.

The chassis 30 disclosed by the present invention can be made by conventional techniques, and there are no limitations regarding the material of the chassis 30. Preferably, the chassis 30 is made by injection molding a plastic material. The chassis 30 can be integrally formed of plastic.

Herein, the front end of the optical disc drive 60 is defined as the end at which the optical disc tray 201 enters and exists the tray opening of the optical disc drive 60 (i.e., the front end is the end facing the +Y direction in FIG. 1), and the end opposite the front end is defined as the rear end (i.e., the rear end is the end facing the −Y direction in FIG. 1). Herein, "front dampers" refer to dampers provided adjacent to the front end of the optical disc drive, and "rear dampers" refer to dampers provided adjacent to the rear end of the optical disc drive. The present invention imposes no limitations on the dampers used. The dampers for use in the present invention can be any conventional dampers that are made of a vibration absorbing material (e.g., a resilient material) and that each have a neck and a positioning hole.

Figure 4:
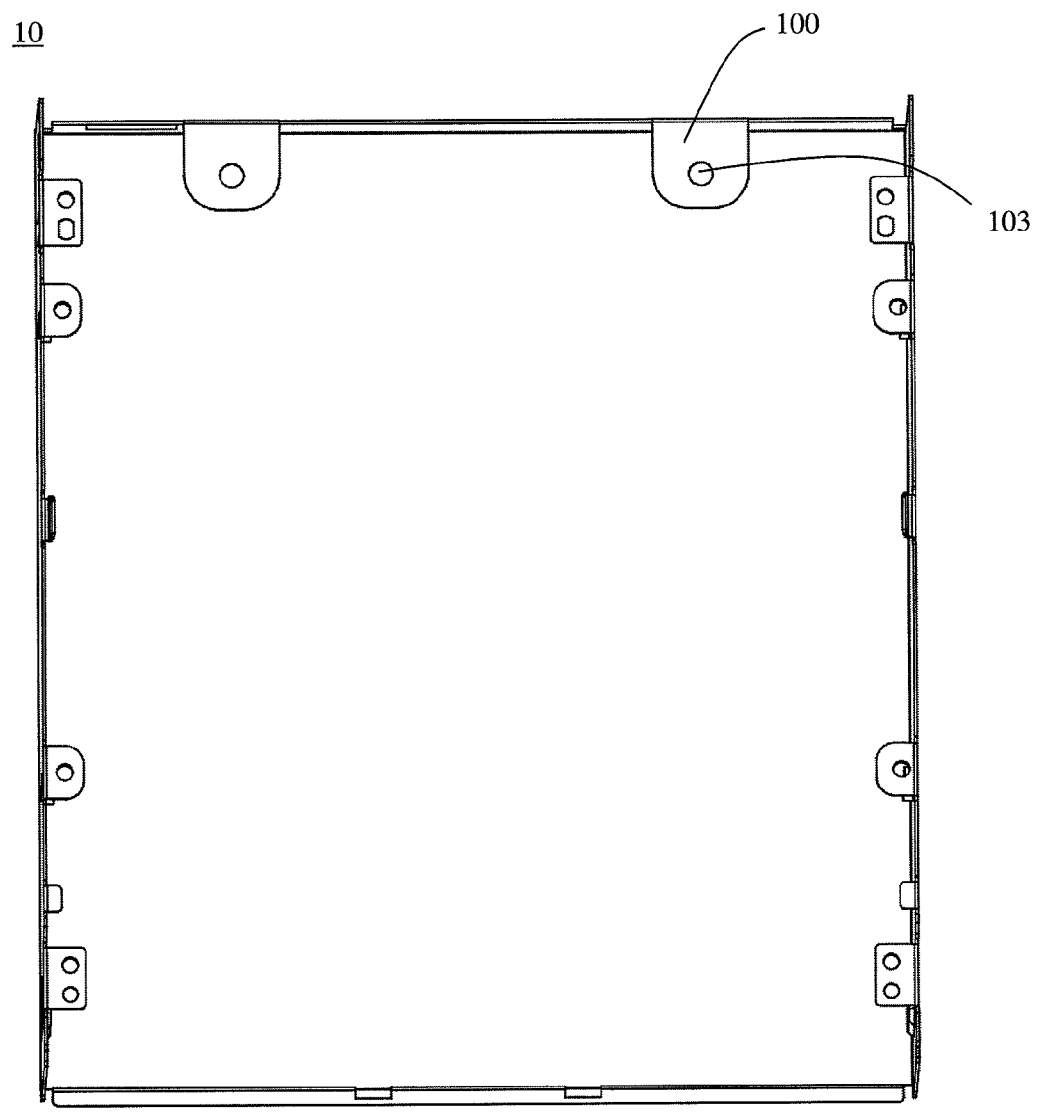
FIG. 4 is a bottom view of the top cover of the optical disc drive according to an embodiment of the present invention.
Figure 5:
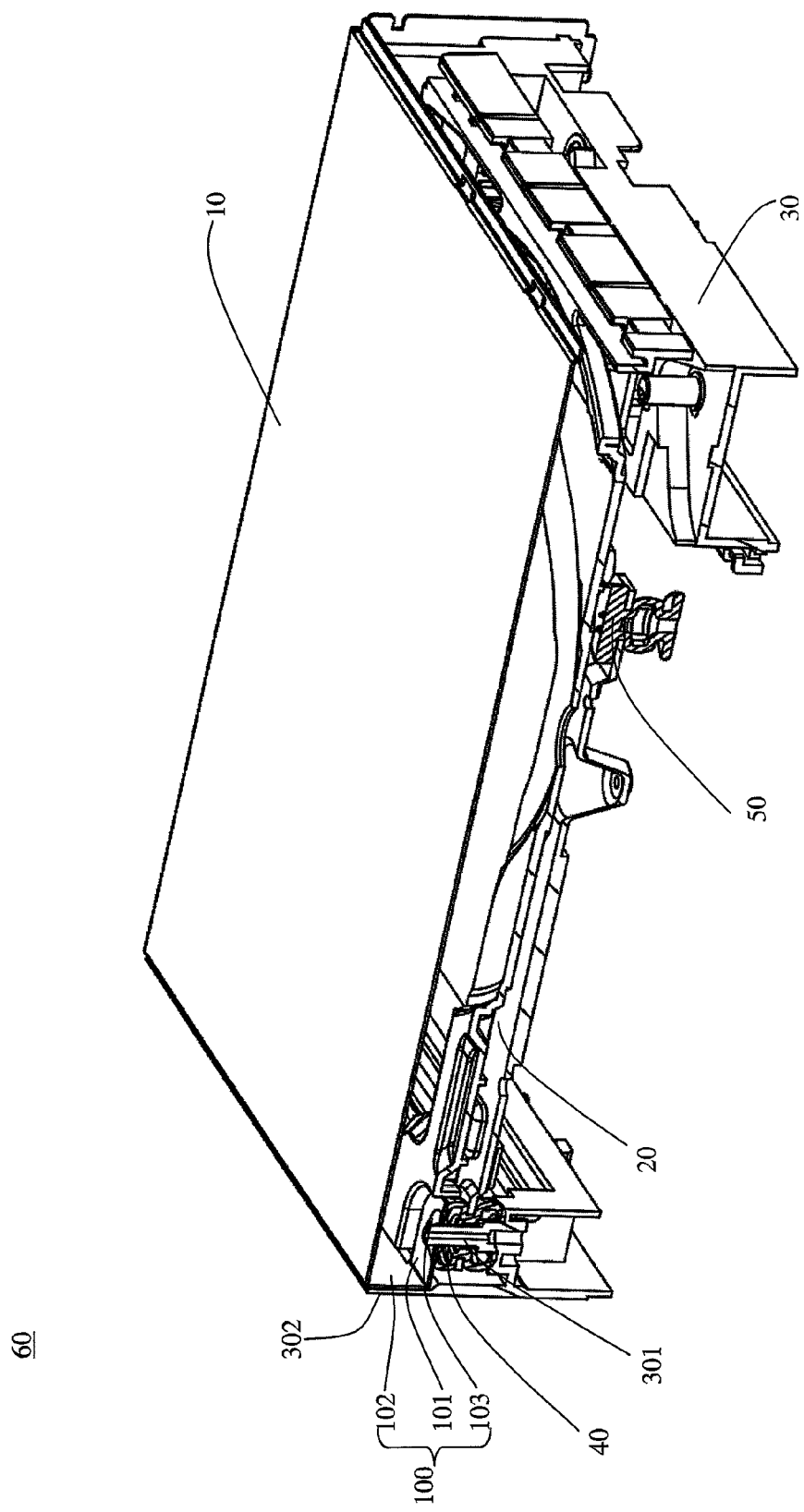
FIG. 5 is a sectional view of the optical disc drive according to an embodiment of the present invention.

Reference is now made to FIG. 4 in conjunction with FIG. 5. FIG. 4 is a bottom view of the top cover 10 of the optical disc drive in an embodiment of the present invention. FIG. 5 is a sectional view of the optical disc drive 60 in an embodiment of the present invention. The top cover 10 of the optical disc drive has a plurality of bent elements 100 for restricting vertical displacement of the corresponding dampers. Each bent element 100 has an L shape and extends substantially vertically downward from an edge of the top cover 10. Each bent element 100 includes a fixing portion 101 and an extension portion 102, wherein the extension portion 102 is bent downward, and extends downward, from the top cover 10, and the fixing portion 101 is substantially perpendicular to the extension portion 102. In addition, the fixing portion 101 of each bent element 100 is provided with a through hole 103 which corresponds to a corresponding one of the positioning pillars 301 on the chassis 30. Once the top cover 10 and the chassis 30 are assembled together, the through holes 103 are respectively penetrated by the corresponding positioning pillars 301 on the chassis 30, and the fixing portions 101 press against the corresponding rear dampers 40 respectively, thereby limiting the degree of freedom in vertical displacement of each rear damper 40, as shown in FIG. 5. The bent elements 100 can be integrally formed with the top cover by bending the top cover.

Referring to FIG. 2 and FIG. 5, the chassis 30 of the optical disc drive in an embodiment of the present invention has a rear side provided with a stop wall 302. When the top cover 10 and the chassis 30 are connected together, the stop wall 302 is located on the outer side of the extension portions 102 of the bent elements 100, as shown more clearly in FIG. 5. This enhances the air-tightness of the optical disc drive 60 and reduces the noise generated by air flow during the reading/writing process of the optical disc drive.

In the optical disc drive damper positioning structure disclosed by the present invention, the rear dampers 40 are respectively and directly mounted around the positioning pillars 301 on the chassis 30 and are thereby positioned and horizontally restricted. Once the chassis 30 and the top cover 10 are assembled together, the bent elements 100 on the top cover 10 press against the corresponding rear dampers 40 respectively to limit the degree of vertical freedom of each rear damper 40. Now that the degrees of horizontal freedom and vertical freedom of each rear damper 40 are limited, making it impossible to displace the rear dampers 40, the screws conventionally required for fastening the dampers can be dispensed with. Consequently, the production cost of assembly jigs can be reduced, and the time otherwise required for fastening the screws can be saved to increase production efficiency.

The preferred embodiments of the present disclosure have been disclosed in the examples to show the applicable value in the related industry. However, the examples should not be construed as a limitation on the actual applicable scope of the invention, and as such, all modifications and alterations without departing from the spirits of the invention and appended claims shall remain within the protected scope and claims of the invention.

What is claimed is:

1. A damper positioning structure of an optical disc drive, wherein the optical disc drive includes a top cover, a traverse, and a chassis, and the damper positioning structure comprising:
    a bent element provided on the top cover and having an extension portion and a fixing portion, wherein the fixing portion has a through hole;
    a positioning pillar provided on the chassis; and
    a damper for supporting and securing the traverse on the chassis, wherein the damper has a positioning hole through which the positioning pillar is insertable;
    wherein, when the top cover is assembled to the chassis, the positioning pillar passes through the through hole of the fixing portion, and the fixing portion presses against the damper.

2. The damper positioning structure of claim 1, wherein the bent element is L-shaped and extends substantially vertically downward from an edge of the top cover.

3. The damper positioning structure of claim 1, wherein the extension portion is bent downward, and extends downward, from the top cover, and the fixing portion is substantially perpendicular to the extension portion.

4. The damper positioning structure of claim 1, wherein the chassis has a rear side provided with a stop wall such that, when the top cover is assembled to the chassis, the stop wall is located on an outer side of the extension portion of the bent element.

5. An optical disc drive, comprising:
    a traverse;
    a top cover having a bent element, the bent element having an extension portion and a fixing portion, wherein the fixing portion has a through hole;
    a chassis having a positioning pillar; and
    a damper for supporting and securing the traverse on the chassis, wherein the damper has a positioning hole through which the positioning pillar is insertable;
    wherein, when the top cover is assembled to the chassis, the positioning pillar passes through the through hole of the fixing portion, and the fixing portion presses against the damper.

6. The optical disc drive of claim 5, wherein the bent element is L-shaped and extends substantially vertically downward from an edge of the top cover.

7. The optical disc drive of claim 5, wherein the extension portion is bent downward, and extends downward, from the top cover, and the fixing portion is substantially perpendicular to the extension portion.

8. The optical disc drive of claim 5, wherein the chassis has a rear side provided with a stop wall such that, when the top cover is connected to the chassis, the stop wall is located on an outer side of the extension portion of the bent element.

* * * * *